United States Patent [19]

Watt

[11] 3,816,280

[45] June 11, 1974

[54] PHOTOPOLYMERIZABLE EPOXY SYSTEMS CONTAINING CYCLIC AMIDE GELATION INHIBITORS

[75] Inventor: William Russell Watt, Princeton Junction, N.J.

[73] Assignee: American Can Company, Greenwich, Conn.

[22] Filed: Dec. 13, 1972

[21] Appl. No.: 314,614

Related U.S. Application Data

[63] Continuation-in-part of Ser. No. 144,642, May 18, 1971, Pat. No. 3,721,617.

[52] U.S. Cl................ 204/159.11, 96/75, 96/91 R, 96/115 P, 117/93.31, 117/132 BE, 117/155 R, 260/2 A, 260/2 EP, 260/47 EP, 260/47 UP, 260/78.3, 260/88.3 R, 260/91.1 A, 260/91.1 M, 260/91.5, 260/93.5 R, 260/94.9 GA, 260/343.6, 260/343.9, 260/830 TW, 260/348 L, 260/348 R, 260/836, 260/837 R, 260/837 A, 204/159.14, 204/159.15, 204/159.18, 204/159.22, 204/159.24

[51] Int. Cl.............................. B01j 1/10, B01j 1/12
[58] Field of Search...... 96/115 P, 115 R, 79, 91 R; 204/159.11, 159.14, 159.22, 159.23, 159.24

[56] References Cited
UNITED STATES PATENTS
3,721,617   3/1973   Watt............................. 204/159.11

*Primary Examiner*—Murray Tillman
*Assistant Examiner*—Richard B. Turer
*Attorney, Agent, or Firm*—Robert P. Auber; Ernestine C. Bartlett; Harries A. Mumma, Jr.

[57] ABSTRACT

Polymerization of epoxides and mixtures of epoxides with lactones and vinyl compounds, polymerizable through the action of cationic catalysts, is controlled by providing, in association with a radiation-sensitive catalyst precursor, a gelation inhibitor in the form of a cyclic amide, such as an N-substituted 2-pyridone, or a 2-pyrrolidinone monomer or polymer substituted in the 1-position.

32 Claims, No Drawings

PHOTOPOLYMERIZABLE EPOXY SYSTEMS CONTAINING CYCLIC AMIDE GELATION INHIBITORS

CROSS-REFERENCE TO RELATED APPLICATIONS

This application is a continuation-in-part application of U.S. application Ser. No. 144,642 filed May 18, 1971, now U.S. Pat. No. 3,721,617 issued Mar. 20, 1973.

BACKGROUND OF THE INVENTION

When a flowable liquid composition is applied to a substrate to form a coating or decoration, or to provide graphic or other information, it may be advantageous shortly after application to obtain rapid hardening, gelling, or curing of the coated material by irradiation for a brief period of time. This is particularly advantageous if the liquid coating composition is substantially free of volatile solvents which do not themselves participate in the curing, since the hardening then may be effected very rapidly without interference from evolving vapors and without producing waste gases. Practical coating systems of these types have been developed, utilizing photosensitive latent curing catalysts which respond to irradiation by releasing the catalytic agent.

One such coating system utilizes epoxide compounds (or mixtures) of relatively low molecular weight, which may be formulated to provide good flow characteristics with or without the use of inert solvents. Cationic polymerization catalysts cause the epoxy ring to open through cleavage of a carbon-oxygen bond, forming a cationic reactive intermediate. The reaction thus initiated may repeat itself rapidly many times in a chain reaction to form a polymer of repeating ether units. Gelling time for such photosensitive catalytic polymerization may be short enough to provide a substantially hardened coating a short distance after irradiation is carried out while the substrate passes at high speed along a treatment line.

The advantages of such radiation-responsive catalytic polymerization are made apparent by comparison with other available systems. Polymerization and cross-linking of epoxide compounds have been carried out by a variety of methods; see, for example, Chapter 5 of "Handbook of Epoxy Resins" By H. Lee and K. Neville, McGraw-Hill Book Company, 1967. A disadvantage of many of the so-called curing reactions is that they begin immediately on mixing reactants. Many of the curing techniques are based on two-component systems in which the two components must be isolated from each other until the curing reaction is to take place. Thus, only that quantity of material is mixed which can be used at once. Many of the curing reactions are slow and are unsuitable for applications which require a rapid transformation from the liquid or thermoplastic state to the solid state. Heat is frequently applied to stimulate or expedite reaction, but this is especially undesirable in applications where the epoxide material is in contact with a heat-sensitive material or where the reduction in viscosity on heating would cause "run-off" of the resin before curing takes place. Careful attention must be given to staying within the temperature limitations of the system involved. In order to prevent harmful effects of thermal curing, it is often necessary to extend the curing cycle an unreasonable length of time.

However, epoxide and related compositions containing photosensitive catalyst precursors have a tendency to gel upon standing, even in the absence of light or ultra-violet radiation. This tendency to undergo premature reaction is particularly troublesome in the case of formulations which are substantially free of unreactive diluents or solvents. The polymerization reaction is exothermal and, where large masses are involved, can generate sufficient heat to cause combustion of the epoxide resins.

SUMMARY OF THE INVENTION

Accordingly, new and improved stabilized polymerizable compositions comprising epoxides and mixtures of epoxides with monomers selected from the group consisting of lactones and vinyl-containing compounds are provided containing radiation-sensitive catalyst precursors and also gelation inhibitors which, upon admixture with the polymerizable materials, inhibit gelation of the reactive composition prior to irradiation. This is accomplished by the inclusion of a small quantity of a cyclic amide or cyclic amides as gelation inhibitors. Such compositions may have greatly extended storage or pot life, premature reaction in the dark or at minimal levels of radiation being inhibited so that the mixtures may be retained for periods of days or more before application. Thus, in accordance with the process of the invention, a mixture first is formed of the polymerizable materials, a Lewis acid catalyst precursor, and the cyclic amide inhibitor. The resulting mixture, at a convenient time subsequently, is subjected to application of energy, such as actinic or electron beam irradiation, to release the Lewis acid catalyst in sufficient amounts to initiate the desired polymerization reaction.

DETAILED DESCRIPTION

Any monomeric or prepolymeric material, or mixture of such materials, of suitable viscosity or suitable miscibility in solvents, which is polymerizable to higher molecular weights through the action of a cationic catalyst, may be utilized in the process and compositions of the present invention. In a preferred embodiment any polymerizable, monomeric or prepolymeric epoxide material or mixture of such epoxide materials, of suitable viscosity alone or when dissolved in a suitable solvent, may be utilized. The classic epoxy resin is obtained by the well known reaction of epichlorohydrin and bisphenol A (4,4'-isopropylidenediphenol). The reaction product is believed to have the form of a polyglycidyl ether of bisphenol A (the glycidyl group being more formally referred to as the 2,3-epoxypropyl group) and thus may be thought of as a polyether derived from the diphenol and glycidol (2,3-epoxy-1-propanol). The structure usually assigned to the resinous product is

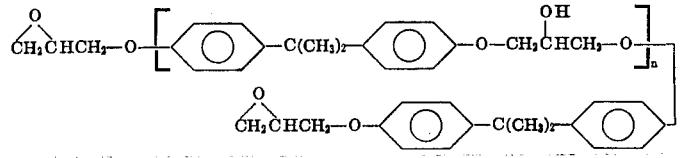

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A ($n=0$), which may be named 2,2-bis[p-(2,3-epoxypropoxy)phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy or oxirane rings is initiated by the action of the Lewis acid halide released when energy is applied to the latent polymerization catalyst.

Many other epoxide materials are available in polymerizable monomeric or prepolymeric forms. Among these are 1,2-epoxycyclohexane (cyclohexene oxide, also named 7-oxabicyclo-[4.1.0]heptane); and vinylcyclohexene dioxide, more specifically named 3-(epoxyethyl)-7-oxabicyclo[4.1.0]-heptane or 1,2-epoxy-4-(epoxyethyl)cyclohexane. Ethylene oxide (oxirane,

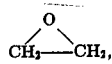

the simplest epoxy ring) and its homologues generally, e.g., propylene oxide (1,2-epoxypropane) and 2,3-epoxybutane, are themselves useful; other useful epoxidic cyclic ethers are the $C_3O$ ring compound trimethylene oxide (oxetane), derivatives thereof such as 3,3-bis(chloromethyl)oxetane (also named 2,2-bis(chloromethyl)-1,3-epoxypropane), and the $C_4O$ ring compound tetrahydrofuran, as examples. Other epoxidized cycloalkenes may be used, a readily available polycyclic diepoxide being dicyclopentadiene dioxide, more specifically identified as 3,4-8,9-diepoxytricyclo[5.2.1.0$^{2,6}$]decane. A suitable polyfunctional cyclic ether is 1,3,5-trioxane.

Glycidyl esters of acrylic acid and of its homologs, methacrylic acid and crotonic acid, are vinyl epoxy monomers of particular interest. Other such monomers are allyl glycidyl ether (1-allyloxy-2,3-epoxypropane) and glycidyl phenyl ether (1,2-epoxy-3-phenoxypropane). Another readily available product is a mixture of ethers of the structure

where R is alkyl, that is, glycidyl alkyl ethers. One such mixture contains predominantly glycidyl octyl ether and decyl glycidyl ether; another contains dodecyl glycidyl ether and glycidyl tetradecyl ether. Epoxidized novolak prepolymers likewise may be used, as well as polyolefin (e.g., polyethylene) epoxides. The latter are exemplified by epoxidized, low molecular weight by-products of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons, or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxycyclohexyl)methyl 3,4-epoxycyclohexanecarboxylate; this same ester may be indexed under the name 7-oxabicyclo[4.1.0]hept-3-ylmethyl 7-oxabicyclo[4.1.0]heptane-3-carboxylate. Another suitable diepoxide may be obtained as an ester of a substituted (epoxycycloalkyl)methanol and a dibasic acid, for example, bis[3,4-epoxy-6-methylcyclohexyl)-methyl] adipate, which may be named alternatively bis-[4-methyl-7-oxabicyclo-[4.1.0]-hept-3-yl)methyl] adipate. Diepoxide monomeric materials may be obtained conveniently as bis(epoxyalkyl) ethers of glycols, an example being the diglycidyl ether of 1,4-butanediol, that is, 1,4-bis-(2,3-epoxypropoxy)butane. This diepoxide is related to the diglycidyl ether of bisphenol A, shown above as 2,2-bis[2,3-epoxypropoxy)phenyl]propane.

Lactones tend to be readily polymerizable under the action of a cationic catalyst such as a Lewis acid. Lactone monomers suitable for admixture in the compositions of the invention may be any lactone which is polymerizable to higher molecular weights through the action of cationic catalysts. Such lactones are described and claimed in co-pending U.S. application Ser. No. 292,759, filed Sept. 27, 1972, entitled "Photopolymerization of Lactones". Lactones preferred for use in the instant compositions are cyclic esters, derived from hydroxy acids and represented by the general formula:

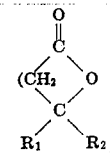

wherein $R_1$ and $R_2$ is hydrogen or alkyl, preferably lower alkyl containing 1 to 6 carbon atoms and $n$, the number of methylene groups, is an integer of 1–13. Such cyclic esters are derived from hydroxy acids containing between 3 to 15 carbon atoms including the beta, gamma, delta and epsilon forms of propiolactone, butyrolactone, caprolactone, pivalolactone, valerolactone, octanoic lactone, pentadecylic lactone, etc. Especially preferred are B-propiolactone and gammabutyrolactone. Many of such compounds are readily available commerically or their preparation is readily had by methods known in the art, for example, by intramolecular conversion of the corresponding hydroxy acid effected by heating.

Various ethylenically unsaturated materials are likewise suitable for admixture in the present invention. The preferred compounds are vinyl compounds, containing a polymerizable

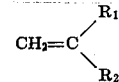

group wherein $R_1$ and $R_2$ may be hydrogen, aryl, alkyl, alkoxy, aryloxy, carbazolyl, etc. Such compounds include styrene, alkyl and halo-substituted styrenes such as $\alpha$-methyl styrene, $\alpha$-chlorostyrene, ethyl styrene; o, m and p-alkyl styrenes such as 2,4-dimethyl styrene, meta-propyl styrene, dichlorostyrene, bromostyrene, etc.; vinyl ethers such as isobutyl vinyl ether, cetyl vinyl ether, vinyl methyl ether, vinyl ethyl ether, dodecyl vinyl ether, vinyl 2-chloroethyl ether, vinyl 2ethylhexyl ether, vinyl isopropyl ether, vinyl decyl ether, vinyl 2- ethoxyethyl ether, vinyl methoxymethyl ether, vinyl benzyl ether, vinyl 3-phenylpropyl ether, vinyl 1-cyclohexyl ethyl ether, vinyl phenyl ether, etc.; vinyl carbazoles such as N-vinyl carbazole, etc.

Such polymerizable monomer mixtures will usually contain a predominant proportion of epoxide material. In general, such mixtures will contain from about 0.25 to 98, preferably 10 to 50 parts epoxide per part of lactone or vinyl monomer.

The materials utilized as latent polymerization initiators in the process and compositions of the present invention are radiation-sensitive catalyst precursors which decompose to provide a Lewis acid upon application of energy. The energy required for effective decomposition may be thermal energy, applied simply by heating, or may be energy applied by bombardment with charged particles, notably by high-energy electron beam irradiation. Preferably, however, the catalyst precursors are photosensitive, and the required energy is imparted by actinic irradiation, which is most effective at those regions of the electromagnetic spectrum at which there is high absorption of electromagnetic energy by the particular catalyst precursor used. More than one of these types of energy may be applied to the same system; e.g., ultraviolet light irradiation followed by electron beam irradiation, and post-heating also may be employed, although irradiation ordinarily can effect a suitable cure.

The preferred photosensitive Lewis acid catalyst precursors are aromatic diazonium salts of complex halogenides, which decompose upon application of energy to release a halide Lewis acid. The aromatic diazonium cation may be represented generally as [Ar-N$^+$≡N], where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by [MX$_{n+m}$]$^{-m}$. Thus, the photosensitive salt and its decomposition upon actinic irradiation may be depicted as follows:

$$[Ar-N^+\equiv N]_m \ [MX_{n+m}]^{-m} \xrightarrow{h\nu} mAr-X + mN_2 + \overline{MX_n},$$

(I)

where X is the halogen ligand of the complex halogenide, M is the metallic or metalloid central atom thereof, $m$ is the net charge on the complex halogenide ion, and $n$ is the number of halogen atoms in the halide Lewis acid compound released. The Lewis acid halide MX$_n$ is an electron pair acceptor, such as FeCl$_3$, SnCl$_4$, PF$_5$, AsF$_5$, SbF$_5$, and BiCl$_3$, which upon suitable irradiation of the diazonium complex salt is released in substantial quantities and initiates or catalyzes the polymerization process, wherein the monomeric or prepolymeric material is polymerized or cured as the result of the actinic irradiation.

The diazonium compounds of the present invention may be prepared using procedures known in the art, and such preparation forms no part of the present invention. Thus, for example, chlorometallic halogenide complexes may be prepared in accordance with the method set forth by Lee et al. in *Journal of the American Chemical Society*, 83, 1928 (1961). Exemplifying a procedure of general utility, arenediazonium hexafluorophosphates can be prepared by diazotizing the corresponding aniline with NOPF$_6$, made by combining HCl and NaNO$_2$, with subsequent addition of hydrogen hexafluorophosphate (HPF$_6$) or of a hexafluorophosphate salt, or they can be prepared by addition of a hexafluorophosphate salt to another diazonium salt to effect precipitation. As a further example, various morpholinoaryl complexes, containing the group

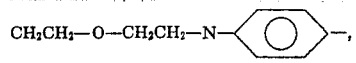

can be prepared either from the aniline derivative or by adding an aqueous solution of a metal salt of the desired complex halogenide to a solution of morpholinobenzenediazonium tetrafluoroborate.

Illustrative of the aromatic diazonium cations comprised in the photosensitive catalyst salts utilized in accordance with the present invention are the following:

p-chlorobenzenediazonium
2,4-dichlorobenzenediazonium
2,5-dichlorobenzenediazonium
2,4,6-trichlorobenzenediazonium
2,4,6-tribromobenzenediazonium
o-nitrobenzenediazonium
p-nitrobenzenediazonium
4-nitro-o-toluenediazonium
  (2-methyl-4-nitrobenzenediazonium)
2-nitro-p-toluenediazonium
  (4-methyl-2-nitrobenzenediazonium)
6-nitro-2,4-xylenediazonium
  (2,4-dimethyl-6-nitrobenzenediazonium)
2-chloro-4-(dimethylamino)-5-
  methoxybenzenediazonium
4-chloro-2,5-dimethoxybenzenediazonium
2,4',5-triethoxy-4-biphenyldiazonium
  (2,5-diethoxy-4-(p-ethoxyphenyl)benzenediazonium)
2,5-dimethoxy-4'-methyl-4-biphenyldiazonium
  (2,5-dimethoxy-4-(p-tolyl)benzenediazonium)
2,5-diethoxy-4-(phenylthio)benzenediazonium
2,5-diethoxy-4-(p-tolylthio)benzenediazonium
p-morpholinobenzenediazonium
2,5-dichloro-4-morpholinobenzenediazonium
2,5-dimethoxy-4-morpholinobenzenediazonium
4-(dimethylamino)-1-naphthalenediazonium Illustrative of the complex halogenide anions comprised in the photosensitive catalyst salts utilized in accordance with the present invention are the following:

tetrachloroferrate(III), FeCl$_4^-$
hexachlorostannate(IV), SnCl$_6^{2-}$
tetrafluoroborate, BF$_4^-$
hexafluorophosphate, PF$_6^-$
hexafluoroarsenate(V), AsF$_6^-$
hexafluoroantimonate(V), SbF$_6^-$
hexachloroantimonate(V), SbCl$_6^-$
pentachlorobismuthate(III), BiCl$_5^{2-}$ A selection of aromatic diazonium salts of complex halogenides is listed in Table I. Many of the salts listed have been found to be well adapted or superior for use as latent photosensitive polymerization initiators in the process and compositions of the present invention, based on thermal stability, on solubility and stability in the epoxy formulations and solvents (if any) used, on photosensitivity, and on ablity to effect polymerization with the desired degree of curing after adequate actinic irradiation. Following the name of each aromatic diazonium halogenide is its melting point or decomposition temperature in degrees centigrade, and wavelengths of electromagnetic radiation, in nanometers, at which it exhibits absorption maxima.

In accordance with the present invention, cyclic amides in which the amide nitrogen atom is free of unsubstituted hydrogen are used in stabilizing amounts as gelation inhibitors. Notable among the compounds found

TABLE 1

| | M.P., °C. | Abs'n Max., nm. |
|---|---|---|
| 2,4-dichlorobenzenediazonium tetrachloroferrate(III) | 62–64 | 259, 285, 360 |
| p-nitrobenzenediazonium tetrachloroferrate(III) | 93–95 | 243, 257, 310, 360 |
| p-morpholinobenzenediazonium tetrachloroferrate(III) | 121.5 | 240, 267, 313, 364 |
| 2,4-dichlorobenzenediazonium hexachlorostannate(IV) | 190 | 285 |
| p-nitrobenzenediazonium hexachlorostannate(IV) | 126 | 258, 310 |
| 2,4-dichlorobenzenediazonium tetrafluoroborate | 152 | 285, 325–340 (shoulder) |
| p-chlorobenzenediazonium hexafluorophosphate | 162–164 | 273 |
| 2,5-dichlorobenzenediazonium hexafluorophosphate | dec. 140 | 264, 318 |
| 2,4,6-trichlorobenzenediazonium hexafluorophosphate | 240–250 | 294, 337 |
| 2,4,6-tribromobenzenediazonium hexafluorophosphate | 245–260 | 306 |
| p-nitrobenzenediazonium hexafluorophosphate | 156 (178) | 258, 310 |
| o-nitrobenzenediazonium hexafluorophosphate | 161.5 | |
| 4-nitro-o-toluenediazonium hexafluorophosphate | 123 (138) | 262, 319 |
| 2-nitro-p-toluenediazonium hexafluorophosphate | 164–165 | 286 |
| 6-nitro-2,4-xylenediazonium hexafluorophosphate | 150 | 237, 290 |
| p-morpholinobenzenediazonium hexafluorophosphate | 162 (181) | 377 |
| 4-chloro-2,5-dimethoxybenzenediazonium hexafluorophosphate | 168–169 (198–208) | 243 (shoulder), 287, 392 |
| 2,5-dimethoxy-4-morpholinobenzenediazonium hexafluorophosphate | Above 135 | 266, 396 |
| 2-chloro-4-(dimethylamino)-5-methoxybenzenediazonium hexafluorophosphate | 111 | 273, 405 |
| 2,5-dimethoxy-4-(p-tolylthio)benzenediazonium hexafluorophosphate | 146 (155) | 358, 400 |
| 2,5-diethoxy-4-(p-tolylthioben-zenediazonium hexafluorophosphate | 147 (150) | 223 (shoulder), 247, 357, 397 |
| 2,5-dimethoxy-4'-methyl-4-biphenyldiazonium hexafluorophosphate | 167 | 405 |
| 2,4',5-triethoxy-4-biphenyldiazonium hexafluorophosphate | 136 | 265, 415 |
| 4-(dimethylamino)-1-naphthalenediazonium hexafluorophosphate | 148 | 280, 310, 410 |
| p-nitrobenzenediazonium hexafluoroarsenate(V) | 141–144 (161) | 257, 310 |
| p-morpholinobenzenediazonium hexafluoroarsenate(V) | 162 (176–177) | 257, 378 |
| 2,5-dichlorobenzenediazonium hexafluoroantimonate(V) | 161–162.5 | 238, 358 |
| p-nitrobenzenediazonium hexafluoroantimonate(V) | 140–141 | 257, 308 |
| p-morpholinobenzenediazonium hexafluoroantimonate(V) | 153 (177.5–180.5) | 254, 374 |
| 2,4-dichlorobenzenediazonium hexachloroantimonate(V) | 178–180 | 279, 322 (shoulder) |
| 2,4-dichlorobenzenediazonium pentachlorobismuthate(III) | 193.5–195 | 285, 313 |
| o-nitrobenzenediazonium pentachlorobismuthate(III) | 166.5–168 | 285, 313 |

The melting points given in Table I were determined generally by the usual visual capillary tube method; in most cases discoloration began below the observed melting point temperature with frothing decomposition at that temperature. In some cases melting points or exotherms were determined also by differential thermal analysis under nitrogen gas, and the temperatures so determined are given in parentheses. The wavelengths of absorption maxima in the ultraviolet-to-visible range were determined with the diazonium complex salt dissolved in acetonitrile.

to be especially effective as the premature-gelation inhibitor in the process and compositions of the present invention are the polymers of 1-vinyl-2-pyrrolidinone, which has the monomeric formula.

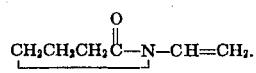

These polymers are available commercially, and their polymeric structure presumably is

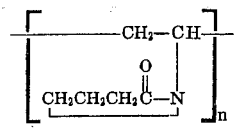

where *n* is an integer greater than 1. Such polymers having average molecular weights, for example, of about 10,000, 40,000, and 360,000 have been found to be effective. These individual molecular weights correspond to average degrees of polymerization (numbers of monomeric units, = *n*) of about 90, 350, and 3,200 respectively. Also useful is the dimer (*n* = 2) having a molecular weight of about 222. An alternative possible structural formula for the dimer, in which the two vinyl groups are joined to form a cyclobutane ring, is

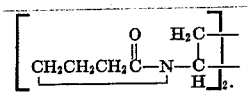

Thus it appears that poly(1-vinyl-2-pyrrolidinone) of practically any degree of polymerization may be used as the stabilizer.

Related cyclic gelation inhibitors are heterocyclic amides which may be represented by the generalized formula

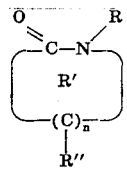

where R is an unreactive group such as (in the monomeric forms) alkyl, each of R' and R'' is hydrogen or an unreactive group, commonly alkyl, and *n* is a lower integer; the bond as shown to an R'' group alternatively may be a double bond to an adjacent carbon atom.

Turning to monomeric C₄N heterocyclic compounds of this type where *n* = 3, preferred compounds are the 1-alkyl-2-pyrrolidinones,

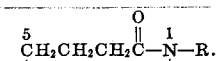

The heterocyclic ring may carry a pendant unreactive substituent (R') on one or more of the available carbon atoms (in the 3-, 4-, and 5-positions) without altering materially the functional efficiency of the N-substituted cyclic amide as a gelation inhibitor. Examples are 1-methyl-2-pyrrolidinone,

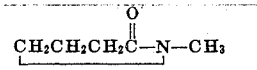

1-ethyl-2-pyrrolidinone,

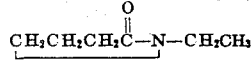

1-butyl-2-pyrrolidinone,

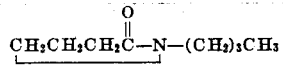

1,5-dimethyl-2-pyrrolidinone,

1-dodecyl-2-pyrrolidinone,

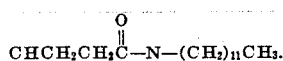

Further examples of gelation-inhibiting cyclic amide materials having a C₄N ring are 1-alkyl-2-pyrrolin-5-ones, such as 1-ethyl-2-methyl-2-pyrrolin-5-one,

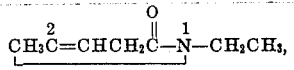

which has a 2-methyl R' substituent with the R'' groups in the 2- and 3-positions replaced by a double bond, and 1-alkyl- 3-pyrrolin-2-ones, such as 1-methyl-3-pyrrolin-2-one,

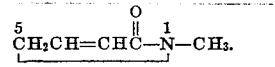

Cyclic amides having larger heterocyclic rings likewise are effective as gelation inhibitors. Thus various C₅N heterocyclic amides where *n* = 4 are available and effective for such use, and other such heterocyclic amides are readily prepared. Found to be well suited for use as a gelation inhibitor, for example, is an N-substituted 2(1H)-pyridone, which conveniently may be 1-methyl-2-(1H)-pyridone,

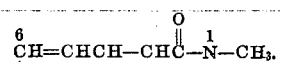

Similarly, N-substituted 2-piperidones may be used, such as 1-methyl-2-piperidone,

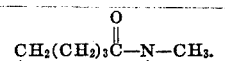

As with poly(1-vinyl-2-pyrrolidinone), discussed hereinabove, 1-vinyl-2-piperidone,

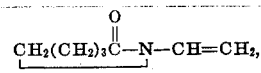

may be polymerized to provide poly(1-vinyl-2-piperidone), which likewise may be used as the gelation inhibitor.

As a further example, a naphthalenic cyclic amide may be used, such as 1-methylcarbostyril (1-methyl-2(1H)-quinolone),

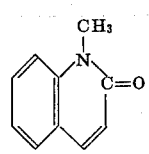

As noted hereinabove, cyclic amides found to be particularly useful are 1-alkyl-2-pyrrolidinone and poly-(1-vinyl-2-pyrrolidinone), wherein the 2-pyrrolidinone moiety is a saturated C₄N heterocyclic ring with the nitrogen conventionally indicated to be in the 1-position. It may be noted that all such amides are 1-substituted, that is, N-substituted 2-pyrrolidinones, with no bond from the nitrogen atom of each pyrrolidine ring to a free hydrogen atom. In the polymeric amide substances, the substituent R on the nitrogen, instead of being simply an alkyl group (for instance), provides an alkylene linkage to the 1-position on the next pyrrolidinone ring, so that the polymeric molecules are polyfunctional with respect to the cyclic amide structure.

Referrring to equation I hereinabove showing the photolytic decomposition of the catalyst precursor, the halide Lewis acid $MX_n$ released reacts with the epoxide or other polymerizable material with a result exemplified by the following:

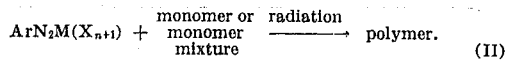

$$\text{ArN}_2\text{M}(X_{n+1}) + \begin{array}{c}\text{monomer or}\\ \text{monomer}\\ \text{mixture}\end{array} \xrightarrow{\text{radiation}} \text{polymer.} \quad \text{(II)}$$

The cationic catalyst is believed to act by cleaving a carbon-oxygen epoxy or lactone bond, or by opening the double bond in a vinyl (ethylenic) monomer, initiating growth of a polymeric chain or permitting formation of a cross-linkage. A general application of the process embodied by equations I and II can be as follows: a diazonium complex salt, for example, as identified hereinabove, is admixed, with or without the use of a suitable solvent, with an epoxy monomer or epoxy monomer in admixture with a lactone or vinyl monomer and a quantity of cyclic amide stabilizer. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the epoxy monomer or mixture of monomers. The resulting polymer is resistant to most solvents and chemicals.

The source of radiation for carrying out the method of the present invention can be any suitable source, such as the ultraviolet actinic radiation produced from a mercury, xenon, or carbon arc, or the electron beam produced in a suitably evacuated cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorption of energy to excite the desired decomposition.

For an imaging system, the mixture, which may contain a suitable solvent in substantial proportions, is coated on a metal plate, dried if necessary to remove solvent present, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of the polymer in this embodiment.

The polymers produced by the polymerizing process of the present invention are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, off-set plates, stencil-making, microimages for printed circuitry, thermoset vesicular images, microimages for information storage, decoration of paper, glass, and packages, and light-cured coatings.

The procedures for mixing the stabilized radiation-sensitive compositions of the present invention using the polymerizable materials are relatively simple. The polymerizable mixture is combined with the catalyst precursor and the cyclic amide inhibitor, if desired with a suitable inert volatile solvent. By such a suitable solvent is meant any solvent compound or mixture which boils below about 190°C and which does not react appreciably with the polymerizable material, the catalyst precursor, or the inhibitor. Examples of such solvents include acetone, toluene, methyl ethyl ketone, ethyl ether, anisole, dimethyl ether of diethylene glycol (bis(2-methoxyethyl) ether), monochlorobenzene, 1,1,2,2-tetrachloroethane, o-chlorotoluene, o-dichlorobenzene, and trichloroethylene or mixtures thereof.

The amount of catalyst precursor employed should be sufficient to insure complete polymerization. It has been found that quite satisfactory results are obtained by providing a diazonium complex salt in amount by weight from about 0.5 percent to about 5 percent of the catalyst precursor relative to the weight of the polymerizable material provided, about 1 percent or less being amply effective with some monomer-catalyst precursor systems.

The amount of the cyclic amide needed for the desired stabilizing effect is determined readily for given ingredients, using simple tests performed quite readily by the skilled formulator, preferably covering a range of test proportions to determine storage or pot life as a function of inhibitor proportion. A convenient test procedure involves viscometer measurements after storage in the dark for a period as long as the maximum storage life needed for the operations in which the stabilizied mixed polymerizable composition is to be used. Most coating and printing operations, for example, can utilize formulations having a viscosity within a substantial predetermined range, whether a relatively low-viscosity or high-viscosity range, and use of the inhibitor can maintain the formulations within the desired viscosity range for a much longer period. The viscosity of the freshly prepared mixture, even if solvent-free, is low enough in some cases to permit quite substantial polymerization before the composition becomes too viscous to be usable.

The examples set out hereinbelow will indicate the range of proportions within which the inhibitor usually is required. As little as 0.05 percent by weight of the cyclic amide relative to the weight of the entire polymerizable composition can be markedly effective for many days of storage, while amounts of the amide over 1 percent by weight seldom are needed. In general, the inhibitor preferably is present in an amount by weight equal to between about 0.02 percent and about 1.5 percent of the weight of the composition. Excessive amounts of the inhibitor may diminish either the short term or the long term stability, or both. It should be kept in mind that unnecessarily large amounts of the inhibitor can decrease quite markedly the catalytic potential of the catalyst precursor, and even may poison the catalyst to the extent that substantial or sufficient curing cannot occur in a reasonable length of time after application of energy to the composition. For this reason, provision of the cyclic amides in great excess of suitable stabilizing amounts should be avoided.

As suggested hereinabove, many cyclic amide derivatives may be used, provided only that the substituents on the heterocyclic ring are substantially inert to the polymerizable material and to the catalyst precursor, which provide the desired end properties of the polymerizable composition as utilized in the polymerizing process of the invention. Of course, in confirming the inert character of a substituted cyclic amide inhibitor, the absence of any substantial deleterious effects on the other constituents of the polymerizable composition need be ascertained only in the presence of the small stabilizing amount of the inhibitor to be used, and over a period of time commensurate with the desired storage or pot life of the composition.

The catalyst precursors listed hereinabove are solids, and the cyclic amide inhibitor utilized in accordance with the present invention also may be a solid at room temperature. While it may be possible to dissolve such solid ingredients in one or more of the polymerizable ingredients making up the epoxide or other polymerizable material utilized in the composition, it usually is more convenient for mixing purposes to provide the solid ingredients for the mixing operation already dissolved in a solvent. The use of a small amount of a solvent medium such as acetone or anisole often is convenient for introducing liquid additives miscible in the medium, as well as solid additives. It has been found that commercial propylene carbonate (a cyclic propylene ester of carbonic acid, probably identified as primarily 4-methyl-1,3-dioxolan-2-one) makes an excellent solvent for cyclic amides. It also is a good solvent for the diazonium complex salts and is completely miscible with epoxy resins. A 7.5 percent, by weight, solution of inhibitor in propylene carbonate may make up somewhat over 2 percent by weight of the entire polymerizable composition. If desired to avoid substantially the disadvantages of utilizing an inert solvent medium, the total amounts of any solvents which do not participate in the polymerization reactions, including a solvent such as propylene carbonate and particularly any volatile solvents present, should be kept below about 4 percent by weight.

It may be desirable, however, to include in the composition an inert pigment or filler, which may be present in even a major proportion by weight, or small amounts of inert nonvolatile liquids such as mineral oil. Inclusion of such inert ingredients usually makes advisable a proportionate increase in the optimum amount of catalyst precursor used. Nevertheless, the precursor needed rarely exceeds 5 percent of the entire weight of the composition, and an amount of the cyclic amide inhibitor less than about 1.5 percent of the total weight usually is sufficient.

The following examples will serve further to illustrate the present invention.

EXAMPLE 1

Two hundred parts by weight of a blend made up of equal parts (by weight) of 1,4-butanediol diglycidyl ether and of (3,4-epoxycyclohexyl)methyl 3,4-epoxycyclohexanecarboxylate were divided into two equal portions. To one portion was added 0.1 part of 1-methyl-2-pyrrolidinone. To each portion were added 2 parts of p-chlorobenzenediazonium hexafluorophosphate. The two formulations were then stored at room temperature in closed containers. After 20 hours they were examined.

The portion containing 1-methyl-2-pyrrolidinone was still a free-flowing liquid. The portion without 1-methyl-2-pyrrolidinone had gelled to a solid mass. The fluid fraction, containing the pyrrolidinone, was spread on an aluminum plate using a No. 3 drawbar. On exposure to a 360-watt high-pressure mercury lamp, the epoxide film hardened to a tough, solid finish.

It will be seen that the addition of a small amount (0.098 percent by weight) of 1-methyl-2-pyrrolidinone prevents premature gelatin of a reactive mixture without destroying capacity of the light-sensitive diazonium complex salt to initiate rapid crosslinking of the epoxide on exposure to ultraviolet radiation.

EXAMPLE 2

A blend of epoxy resins was prepared as follows:

| Epoxy Resin | Viscosity (25°C), Centipoises | Epoxy Value | Parts by Weight |
|---|---|---|---|
| Diglycidyl ether of bisphenol A | 4000 – 6000 | 0.57 | 1800 |
| (3,4-epoxycyclohexyl)-methyl 3,4-epoxycyclohexanecarboxylate | 275 | 0.72 | 900 |
| Alkyl glycidyl ether in which alkyl groups are predominantly n-dodecyl and n-tetradecyl | 8.5 | 0.39 | 270 |

Two aliquots of 400 grams each were removed. To the first were added 2.4 grams of p-chlorobenzenediazonium hexafluorophosphate and 8 ml (6.34 g) of acetone. To the second were added 2.4 grams of p-chlorobenzenediazonium hexafluorophosphate, 8 ml of acetone, and 0.45 gram (0.11 percent) of 1-methyl-2-pyrrolidinone. The two samples then were stirred until the diazonium complex salt dissolved and thereafter were stored in the dark at room temperature. Periodically the viscosity was measured by means of a Brookfield viscometer.

| Age of Sample, Hrs. | Viscosity at 25°C, Centipoises | |
|---|---|---|
| | Sample Without Pyrrolidinone | Sample With Pyrrolidinone |
| 0 | 580 | 580 |
| 16 | Gelled | 580 |
| 88 | — | 730 |

A portion of the sample containing 1-methyl-2-pyrrolidinone, 24 hours after mixing (by which time the other sample had gelled to an intractable mass) was used to coat paperboard by means of a roller coater. The coated paperboard was exposed to a 1,200-watt high-pressure mercury lamp for 5 seconds at a distance of 5 inches. The coating cured to a hard, glossy, nontacky finish showing excellent adhesion to the paperboard and good resistance to organic solvents such as acetone and heptane.

EXAMPLE 3

1.4 gram of p-chlorobenzenediazonium hexafluorophosphate, 5 ml of acetone, and 0.125 gram (0.061 percent) of 1-methyl-2-pyrrolidinone were added to a 200 gram portion of the resin blend given above in Example 2. A fraction of this formulation was applied to a paperboard surface using a roller coater. The coated board then was exposed to the radiation from a 1,200-watt high-pressure mercury lamp at a distance of 5 inches for 1 second. The coating cured to a tough, glossy, non-tacky, solvent-resistant finish and showed excellent adhesion to the paperboard.

On storage in the dark at room temperature, the viscosity of the formulation changed from 580 to 850 centipoises over a period of 5 days.

EXAMPLE 4

| Epoxy Resin | Viscosity (25°C), Cps. | Epoxy Value | Parts by Weight |
|---|---|---|---|
| Diglycidyl ether of bisphenol A | 6500–9500 | 0.55 | 1620 |
| (3,4-epoxycyclohexyl)methyl 3,4-epoxycyclohexanecarboxylate | 275 | 0.72 | 1080 |
| Alkyl glycidyl ether in which alkyl groups are predominantly dodecyl and tetradecyl | 8 | 0.38 | 450 |

Another epoxide blend was made as shown above. Six aliquots of 400 grams each were measured out, and to each were added 10 ml of a 1.0 molar solution of p-chlorobenzenediazonium hexafluorophosphate in acetone and (except to the first aliquot) 1-methyl-2-pyrrolidinone gelation inhibitor, as shown in Table II. Inhibitor proportions ranged from somewhat under 0.05 percent to about 0.2 percent by weight. The solutions were mixed thoroughly and stored in the dark at 25°C. Periodically the viscosities were measured, using a Brookfield viscometer. Results are summarized in Table II.

TABLE II

| Sample No. | Drops 1-methyl-2-pyrrolidinone | Viscosity, Cps., After Standing | | |
|---|---|---|---|---|
| | | 18 hrs. | 42 hrs. | 66 hrs. |
| 4a | 0 | Gelled | — | — |
| 4b | 3 | 600 | 1820 | Gelled |
| 4c | 6 | 440 | 620 | 920 |
| 4d | 9 | 410 | 640 | 680 |
| 4e | 12 | 410 | 540 | 580 |
| 4f | 15 | 400 | 540 | 520 |

EXAMPLE 5

A batch of the epoxide blend described in Example 2 was prepared and three aliquots of 350 grams each taken therefrom. To each was added a solution of 2.45 grams of p-chlorobenzenediazonium hexafluorophosphate in 4.0 ml (4.82 g) of propylene carbonate. Of these three samples, sample 5a, with no further additives, had an initial viscosity, determined at 23°C with the Brookfield viscometer, of 685 cps. After 3 days the viscosity had risen in the dark to a high value of 9,800 cps, and the sample had gelled by the sixth day.

To the second sample 5B was added 0.49 gram (0.14 percent of the total weight) of liquid 1-ethyl-2-pyrrolidinone. The initial Brookfield viscosity at 23°C of sample 5B was measured at 805 cps. After 8 days a still tractable viscosity of 930 cps was measured.

To the third sample 5C was added an N-alkyl-substituted cyclic amide having an unsaturated $C_5N$ ring, specifically, 0.47 gram (0.13%) of liquid 1-methyl-2(1H)-pyridone. The initial Brookfield viscosity at 23°C of 770 cps increased by the end of a 6 day period to 927 cps.

EXAMPLE 6

Two aliquots of 400 grams each were taken from a batch of the epoxide blend given in Example 2. To one part was added a solution of 4.0 grams of p-chlorobenzenediazonium hexafluorophosphate in 8 ml (9.64 g) of propylene carbonate. To the other part were added 4.0 grams of p-chlorobenzenediazonium hexafluorophosphate and also 0.8 gram (0.19 percent) of the overall weight) of a poly(1-vinyl-2-pyrrolidinone) stabilizer having an average molecular weight of 40,000, both dissolved in 8 ml of propylene carbonate. Both formulations then were stored at room temperature. Brookfield viscosity was measured periodically and increased as shown below.

| Age of Formulations, Hours | Viscosity (25°C), Centipoises | |
|---|---|---|
| | Without Stabilizer | With Stabilizer |
| 1 | 885 | 718 |
| 24 | 1,343 | 836 |
| 72 | Gelled | 850 |
| 168 | — | 1,438 |
| 240 | — | 2,945 |
| 264 | — | 3,480 |
| 336 | — | Gelled |

To establish that the poly(vinylpyrrolidinone) stabilizer does not inhibit curing of the light-sensitive composition when energy is applied to these formulations by exposure to ultraviolet radiation, both formulations were spread in thin films over a paper surface and exposed to a high-pressure mercury arc. Both films cured to a non-tacky finish at the same rate.

EXAMPLE 7

Cresol or phenol novolaks are made, following procedures well known in the phenol-formaldehyde resin art, by a condensation reaction involving formaldehyde and a commercial grade of cresol (or phenol) in excess amounts, yielding liquid or low-fusing thermoplastic products. Such products are available in epoxidized forms, having average molecular weights in the vicinity of 1,000 and epoxy equivalent weights in the vicinity of 200. One such epoxy-cresol novolak resin was used in a blend with other epoxide materials, as shown in the following example.

A large batch was prepared by mixing together the specified epoxides in accordance with the following:

| Epoxide | Epoxy Eq. Wt. | Viscosity, Cps. | Parts By Weight |
|---|---|---|---|
| Liquid epoxy-novolak resin | 172–179 | 1400–2000 at 52°C) | 4 |
| Diglycidyl ether of 1,4-butanediol | 134 | 15 (at 25°C) | 4 |
| Alkyl glycidyl ether in which alkyl groups are predominantly dodecyl and tetradecyl | 286 | 8.5 (at 25°C) | 1 |

Two aliquots of 400 grams each were withdrawn from this batch. To one aliquot (sample 7A) was added a solution of 4.0 grams of 2,5-diethoxy-4-(p-tolylthio) benzenediazonium hexafluorophosphate in 8 ml (9.64 g) of propylene carbonate. To the other aliquot (sample 7B) was added a solution of 0.8 gram of poly(1-vinyl-2-pyrrolidinone) of 40,000 average molecular weight and 4 grams of 2,5-diethoxy-4-(p-tolylthio) benzenediazonium hexafluorophosphate in 8 ml of propylene carbonate. The two mixtures thus were identical, except for the 0.8 gram (0.19 percent) of poly(vinylpyrrolidinone) added to one of them. Both mixtures were stored in the dark at room temperature. At intervals, as noted below, their viscosities were measured using a Brookfield viscometer. Results were as follows:

| Sample No. | Viscosity at 23°C | | | After Standing, Cps. | | |
|---|---|---|---|---|---|---|
| | 1 hr. | 24 hrs. | 72 hrs. | 96 hrs. | 168 hrs. | 240 hrs. |
| Sample N. 7A | 95 | 113 | 369 | 1507 | 4635 | 12,970 |
| 7B | 106 | 124 | 236 | 284 | 385 | 522 |

EXAMPLE 8

Two photosensitive epoxide resin formulations were prepared as follows.

Formulation 8A (without stabilizer) was made by mixing 100 grams of the diglycidyl ether of 1,4- butanediol, 100 grams of (3,4-epoxycyclohexyl)methyl 3,4-epoxycyclohexanecarboxylate, and a solution of 2 grams of p-chlorobenzenediazonium hexafluorophosphate in 4 ml of propylene carbonate.

Formulation 8B was made as above, but with 0.4 gram (0.19%) of poly(1-vinyl-2-pyrrolidinone) of 40,000 average molecular weight dissolved in the propylene carbonate.

The two formulations were placed side by side on a laboratory bench, and the temperature of each was recorded from the moment of introducing the propylene carbonate solutions. The following temperature changes were noted:

| Time After Mixing Minutes | Temperature, °C Formulation 8A | Formulation 8B |
|---|---|---|
| 0 | 21 | 21 |
| 20 | 30 | 21 |
| 25 | 37 | 21 |
| 30 | 49 | 21 |
| 34 | 89 | 21 |
| 57 | — | 21 |

A strong exothermal reaction occurred in the unstabilized formulation 8A, starting almost immediately after mixing and gaining momentum after about half an hour had passed. After 34 minutes had elapsed the temperature of formulation 8A was measured for the last time, but the rising temperature at that time indicated that polymerization was progressing vigorously, and the formulation gelled shortly thereafter. The stabilized formulation 8B showed no thermal evidence at all of polymerization during the period of measurement.

EXAMPLE 9

A large master batch was prepared by mixing together the following epoxides:

| Epoxide | Epoxy Eq. Wt. | Viscosity at 25°C, Cps. | Parts by Weight |
|---|---|---|---|
| Diglycidyl ether of bisphenol A | 172–178 | 4000–6000 | 20 |
| (3,4-epoxycyclohexyl)methyl 3,4-epoxycyclohexanecarboxylate | 131–143 | 350–450 | 10 |
| Alkyl glycidyl ether in which alkyl groups are predominantly dodecyl and tetradecyl | 286 | 8.5 | 3 |

Five aliquots of 400 grams were withdrawn from the master batch, and to each were added 8 ml of a solution of propylene carbonate containing 4 grams of p-chlorobenzenediazonium hexafluorophosphate and a measured amount of poly(1-vinyl-2-pyrrolidinone) stabilizer, average molecular weight approximately 40,000, as shown below. Except for the first sample, proportions of stabilizer used ranged from about 0.2 percent to about 1 percent by weight. The photosensitive formulations were stored in the dark at room temperature. Viscosities were measured with a Brookfield viscometer, giving the results shown below with respect to each sample so prepared:

| Sample No. | Stabilizer Added, Gms | Viscosity at 23°C After Standing, Centipoises | | | | | | |
|---|---|---|---|---|---|---|---|---|
| | | 1 hr. | 24 hrs. | 48 hrs. | 72 hrs. | 216 hrs. | 264 hrs. | 336 hrs. |
| 9A | None | 885 | 1343 | — | gel | — | — | — |
| 9B | 0.8 | 770 | 700 | 658 | 776 | 2765 | 8675 | gel |
| 9C | 1.6 | 814 | 806 | 744 | 1008 | 5705 | gel | — |
| 9D | 2.4 | 965 | 1244 | 1331 | 1322 | 5325 | 12980 | gel |
| 9E | 4.0 | 1398 | 906 | 970 | 1245 | gel | — | — |

Shortly after mixing the above formulations, a small sample was withdrawn from each and applied to a square of coating-holdout paper, treated to prevent rapid penetration, by means of a roller coater. The coated paper was placed on a conveyor moving beneath two 1,200-watt high pressure mercury arc lamps at a distance of 2½ inches. The conveyor was moving at 480 feet per minute. The coatings in each case cured to a hard, non-tacky finish, indicating that the poly(vinyl-pyrrolidinone) does not prevent cross-linking of the epoxide under the influence of the irradiated photodecomposable diazonium complex salt.

EXAMPLE 10

Four additional 400-gram aliquots were withdrawn from the resin master batch used in preparing the test samples for Example 9. To each of these aliquots were added 2.8 grams of p-chlorobenzenediazonium hexafluorophosphate in 8 ml of propylene carbonate, which also contained poly(vinylpyrrolidinone) stabilizer in a range of proportions, similarly to the samples used in Example 9. To test pot life at a higher temperature, all of these four sample formulations were placed in a constant-temperature bath maintained at 35°C. Viscosities were measured periodically at the bath temperature, using a Brookfield viscometer, with the following results:

| Sample No. | Amount of Stabilizer, Gms. | Viscosity at 35°C | | | After Aging, Cps. | | |
|---|---|---|---|---|---|---|---|
| | | 5 mins. | 3 hrs. | 22 hrs. | 46 hrs. | 70 hrs. | 142 hrs. |
| 10A | None | 280 | 1345 | gel | — | — | — |
| 10B | 0.8 | — | 272 | 418 | 1388 | gel | — |
| 10C | 1.6 | — | 292 | 354 | 570 | 1111 | gel |
| 10D | 4.0 | — | 292 | 372 | 837 | 1655 | gel |

EXAMPLE 11

A resin blend was prepared as in Example 9 to provide two 400 gram aliquots. To one aliquot were added 8 ml of a 1.23 molar solution of p-chlorobenzenediazonium hexafluorophosphate in propylene carbonate. To the other aliquot were added 8 ml of the same solution containing additionally 1.6 grams of poly(1-vinyl-2-pyrrolidinone) of approximately 38,000 average molecular weight, the molecular weight being specified as 38,000 plus or minus 10 percent.

These two formulations containing the catalyst precursor were immersed in a constant temperature bath at 35°C. The formulation without poly(vinylpyrrolidinone) gelled to a solid mass within 24 hours. The formulation containing the poly(vinylpyrrolidinone) remained in an easily handled fluid state for more than 48 hours; it had gelled after standing 5 days.

| Sample No. | Stabilizer Added,Gms | Viscosity at 35°C After Aging, Cps. | | | | |
|---|---|---|---|---|---|---|
| | | 1 hr. | 24 hrs. | 48 hrs. | 168 hrs. | 192 hrs. |
| 13A | None | 294 | 757 | Gelled | — | — |
| 13B | 0.6 | 254 | 303 | 362 | 2505 | 3920 |
| 13C | 1.2 | 252 | 304 | 326 | 907 | 1055 |
| 13D | 1.8 | 305 | 294 | 319 | 543 | 638 |
| 13E | 2.4 | 320 | 299 | 315 | 479 | 526 |

EXAMPLE 12

A resin blend was prepared as in Example 11 and three 400 gram aliquots withdrawn. The sample of formulation 12A was prepared by mixing into one aliquot 8 ml of a propylene carbonate solution containing 2.8 grams of p-chlorobenzenediazonium hexafluorophosphate. Formulations 12B and 12C were prepared likewise, but with 0.8 gram and 1.6 grams respectively of another poly(1-vinyl-2-pyrrolidinone) product dissolved additionally in the propylene carbonate; the poly-(vinylpyrrolidinone) stabilizer used in these formulations had an average molecular weight of approximately 10,000.

The three formulations containing the catalyst precursor were immersed in a constant temperature bath maintained at 35°C and allowed to reach thermal equilibrium. Viscosities were measured periodically, using a Brookfield viscometer, with the following results:

| Sample No. | Stabilizer Added, Gms. | Viscosity at 35°C After Standing, Cps | | |
|---|---|---|---|---|
| | | 1 hr. | 48 hrs. | 120 hrs. |
| 12A | None | 294 | Gelled | — |
| 12B | 0.8 | 267 | 1253 | Gelled |
| 12C | 1.6 | 279 | 657 | Gelled |

EXAMPLE 13

A large quantity of a resin blend having the composition shown in Example 9 was prepared and a number of 400 gram aliquots withdrawn. To individual aliquots were added 6 ml of a propylene carbonate solution containing 2.8 grams of p-chlorobenzenediazonium hexafluorophosphate and the dimer of 1-vinyl-2-pyrrolidinone in amounts specified below. These formulations containing the catalyst precursor and various amounts of stabilizer were immersed in a constant temperature bath maintained at 35°C and allowed to reach temperature equilibrium. Viscosities were measured periodically using a Brookfield viscometer, with the following results:

EXAMPLE 14

Additional 400-gram aliquots, taken from the resin blend used in Example 13, were mixed individually with 8 ml of a propylene carbonate solution containing 4 grams of p-chlorobenzenediazonium hexafluorophosphate and containing also varying amounts of 1-vinyl-2-pyrrolidinone dimer or polymer as specified below. These formulations were immersed in a constant temperature bath maintained at 35°C and allowed to come to thermal equilibrium. Viscosities were measured periodically using a Brookfield viscometer, with the following results:

| Sample No. | Stabilizer Added Polymer Type | Grams | Viscosity at 35°C After Aging, Cps | | | | |
|---|---|---|---|---|---|---|---|
| | | | 1 hr. | 24 hrs. | 48 hrs. | 72 hrs. | 168 hrs. |
| 14A | Poly(1-vinyl-2-pyrrolidinone),Mol.Wt. ca. 10,000 | 0.8 | 337 | 1245 | Gel | — | — |
| 14B | 1-vinyl-2-pyrrolidinone dimer | 0.8 | 299 | 333 | 366 | 438 | 1694 |
| 14C | (Same) | 0.64 | 295 | 342 | 413 | 547 | 7560 |
| 14D | (Same) | 0.48 | 284 | 340 | 450 | 726 | Gel |
| 14E | — | None | 325 | Gel | — | — | — |

Fractions of each of these five formulations were withdrawn within a few hours of mixing and applied to a clay-coated paper using a drawbar. The paper then was passed rapidly under a 1,200-watt high-pressure mercury arc lamp at a distance of 3 inches. The epoxy resin coating of each sample cured to a hard, glossy finish in less than one second.

Example 15

A number of 400-gram aliquots from the resin blend of Example 13 were mixed individually with 8 ml of a propylene carbonate solution containing 4 grams of p-chlorobenzenediazonium hexafluorophosphate and varying amounts of 1-vinyl-2-pyrrolidinone dimer as specified below. These formulations were immersed in a constant temperature bath at 40°C and allowed to reach thermal equilibrium. Viscosities were measured periodically using a Brookfield viscometer, with the following results:

| Sample No. | Dimer Added, Gms | Viscosity at 40°C After Aging, Cps. | | | | | | | |
|---|---|---|---|---|---|---|---|---|---|
| | | 1 hr. | 24 hrs. | 48 hrs. | 72 hrs. | 96 hrs. | 168 hrs. | 192 hrs. | 216 hrs. |
| 15A | None | 263* | Gel | — | — | — | — | — | — |
| 15B | 0.96 | 196 | 227 | 292 | 374 | 638 | Gel | — | — |
| 15C | 1.12 | 196 | 226 | 269 | 319 | 500 | 22,650 | Gel | — |
| 15D | 1.28 | 192 | 220 | 261 | 331 | 501 | 4,435 | 14,750 | Gel |

*Gelled in less than 4 hours.

Example 16

Tests using additional 400 gram resin aliquots were conducted as described in Example 15, except that the four formulations were stored at room temperature (23°C) rather than at 40°C. Viscosity measurements after aging gave the following results:

| Sample No. | Dimer Added, Gms | Viscosity at 23°C After Aging, Cps. | | | | |
|---|---|---|---|---|---|---|
| | | 1 hr. | 24 hrs. | 96 hrs. | 168 hrs. | 360 hrs. | 502 hrs. |
| 16A | None | 776 | Gel | — | — | — | — |
| 16B | 0.96 | 561 | 665 | 790 | 870 | 1115 | 1172 |
| 16C | 1.12 | 586 | 673 | 733 | 810 | 1055 | 1170 |
| 16D | 1.28 | 571 | 676 | 730 | 807 | 1050 | 1180 |

Portions withdrawn from each of these formulations were applied as thin films over clay-coated paperboard using a roller coater. The coated board was placed on a conveyor moving at 500 feet per minute and passed beneath two 1,200-watt mercury arc lamps supported 3 inches above the conveyor. The epoxy films cured to a glossy, non-tacky finish. This demonstrates that the vinylpyrrolidinone dimer, while inhibiting premature gelation, does not prevent rapid curing of the compositions when exposed to actinic radiation.

Example 17

Additional 400-gram aliquots, taken from the resin blend described in Example 13, were mixed individually with 8 ml of a propylene carbonate solution containing 4 grams of p-chlorobenzenediazonium hexafluorophosphate and gelation inhibitors as specified below. The formulations, all containing the catalyst precursor, were immersed in a constant-temperature bath maintained at 40°C and allowed to come to thermal equilibrium. Viscosities were measured after one hour and after 24 hours using a Brookfield viscometer, with the following results:

| Sample No. | Inhibitor Added Compound | Grams | Viscosity at 40°C, Cps. After 1 hr. | After 24 hrs. |
|---|---|---|---|---|
| 17A | — | None | 263 | Gelled |
| 17B | 1-methyl-2-piperidone | 0.452 | 177 | 355 |
| 17C | 1-butyl-2-pyrrolidinone | 0.564 | 175 | 428 |
| 17D | 1-ethyl-2-pyrrolidinone | 0.452 | 173 | 365 |

Example 18

Several large batches were prepared by mixing together the following epoxides in the indicated proportions:

| Epoxide | Epoxy Equiv. Wt. | 25°C. Viscosity, Cps. | Parts by Weight |
|---|---|---|---|
| Diglycidyl ether of bisphenol A | 172–178 | 4000–6000 | 55 |
| (3,4-epoxycyclohexyl)-methyl 3,4-epoxycyclohexanecarboxylate | 131–143 | 350–450 | 30 |
| Alkyl glycidyl ether in which alkyl groups are predominantly dodecyl and tetradecyl | 286 | 8.5 | 15 |

A number of 50 gram samples were withdrawn from these batches. To each such sample was added 1.10 g. of propylene carbonate, containing dissolved therein 0.55 g. of 4-chlorobenzene diazonium hexafluorophosphate as the catalyst precursor. Viscosity measurements were made at 25°C., unless otherwise indicated, employing a Brookfield viscometer.

a. A 10 g aliquot of a mixture containing 50 g of the epoxide blend described above, 5.0 g styrene, 0.55 g 4-chlorophenyl diazonium hexafluorophosphate and 1.10 g propylene carbonate was found to have an initial viscosity of 98 centipoises. After 20 hours, the viscosity had increased to 1870 centipoises.

b. Another 10 g. aliquot of the mixture of (a) above but to which 0.02 g N-methyl pyrrolidone had been added was found to have a viscosity of 125 centipoises after the 20 hour period.

Example 19 a. A 10 g. aliquot of a mixture containing 50 g of the epoxide blend described in Example 18, 5.0 g gamma-butyrolactone, 0.55 g 4-chlorobenzenediazonium hexafluorophosphate and 1.10 g. propylene carbonate was stored at 0°C for 16 hours. The initial viscosity measured at 25°C was found to be 133 centipoises. After standing at room temperature for an additional 2 hours, the viscosity increased to 2,420 centipoises.

b. Another 10 g. aliquot of the same composition as in (a) above but to which 0.02 g N-methyl pyrrolidone was added was found to have a viscosity of 115 centipoises at 25°C after standing for 16 hours at 0°C. After standing at room temperature for an additional 2 hours, the viscosity was found to be 117 centipoises.

Example 20 a. A 10 g. aliquot of a mixture containing 50 g of the epoxy blend of Example 18, 1.5 g dodecyl vinyl ether, 0.52 g 4-chlorobenzene diazonium hexafluorophosphate and 1.04 g propylene carbonate was found to gel to a solid state within 45 minutes.

b. Another 10 g aliquot of the same composition as in (a) above but to which 0.02 g N-methyl-pyrrolidone was added was found to reach the gel state after 17 hours.

As used hereinabove, the term epoxy equivalent weight (Epoxy Eq. Wt.) has the usual meaning, i.e., the weight of a portion of the epoxide substance that contains one atomic weight of epoxy oxygen. The related term "epoxy value" is used commercially for convenience; the epoxy value may be derived from the epoxy equivalent weight by the following relationship:

(Epoxy value) $\times$ (Epoxy equivalent weight) = 100.

As discussed in some detail herein, several components — namely, the polymerizable material, the catalyst precursor, and the gelation inhibitor—are provided in admixture in the stabilized polymerizable compositions of the present invention. It will be appreciated that these several components should be compatible with each other in the sense of substantial freedom from mutual chemical attack during storage prior to irradiation. Moreover, the three components also should be compatible in the sense of mutual physical affinity. Thus, it would not be preferable to provide either the gelation inhibitor or the catalyst precursor in the mixture in the form of undissolved solid particles distributed there-through, even though such solid particles might perform to some degree their intended functions, respectively, of counter-activity against prematurely formed Lewis acid, and of release of the Lewis acid catalyst upon eventual irradiation.

While there have been described particular embodiments of the invention, including those at present considered to be the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A stabilized polymerizable composition, comprising a polymerizable material consisting essentially of:
a monomeric or prepolymeric epoxide or mixture thereof in admixture with a monomer selected from the group consisting of lactones and vinyl-containing compounds having the general formula:

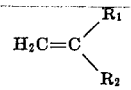

wherein $R_1$ and $R_2$ are hydrogen, alkyl, alkoxy, aryl, aryloxy, halogen, haloalkyl, haloaryl and carbazolyl,
said mixture being polymerizable to higher molecular weights through the action of a cationic catalyst;
a radiation-sensitive catalyst precursor which decomposes upon application of energy to provide a Lewis acid effective to initiate polymerization of said polymerizable material, said precursor being an aromatic diazonium salt of a complex halogenide,
and a stabilizing amount of a gelation inhibitor for counteracting prematurely formed Lewis acid, said inhibitor being a cyclic amide in which the amide nitrogen atom is free of unsubstituted hydrogen, and said stabilizing amount of the inhibitor being substantially inert to said polymerizable material and said catalyst precursor.

2. The composition of claim 1, in which the monomeric or prepolymeric epoxide is a mixture of epoxides.

3. The composition of claim 1, in which the polymerizable material is a mixture of epoxides and a lactone.

4. The composition of claim 3, in which said lactone is gamma-butyro-lactone.

5. The composition of claim 1, in which the polymerizable material is a mixture of epoxides and a vinyl-containing compound.

6. The composition of claim 5, in which said vinyl-containing compound is styrene.

7. The composition of claim 5, in which said vinyl-containing compound is dodecyl vinyl ether.

8. The composition of claim 1, in which said catalyst precursor is present in an amount equal to between about 0.5 percent and about 5 percent of the weight of said polymerizable material present in the composition.

9. The composition of claim 1, in which said cyclic amide is selected from the group consisting of 1-alkyl-2-pyrrolidinone, 1-alkyl-2-piperidone, 1-alkyl-2(1H)-pyridone, and poly(1-vinyl-2-pyrrolidinone).

10. The composition of claim 1, in which said cyclic amide is a 1-substituted 2-pyrrolidinone.

11. The composition of claim 1, in which said cyclic amide is 1-alkyl-2-pyrrolidinone.

12. The composition of claim 1, in which said cyclic amide is 1-methyl-2-pyrrolidinone.

13. The composition of claim 1, in which said cyclic amide is poly(1-vinyl-2-pyrrolidinone).

14. The composition of claim 1, in which said gelation inhibitor is present in an amount by weight equal to between about 0.02 percent and about 1.5 percent of the weight of the composition.

15. The composition of claim 1, in which the total amount of any unpolymerizable volatile solvents present in said composition is less than about 4 percent by weight of the composition.

16. A stabilized polymerizable composition, comprising:
a liquid monomeric or prepolymeric epoxide material or mixtures of epoxide materials with a monomer selected from the group consisting of gamma butyrolactone, styrene and dodecyl vinyl ether, said mixture being polymerizable to higher molecular weights through the action of a cationic catalyst;
an aromatic diazonium salt of a complex halogenide which decomposes upon application of energy to provide a halide Lewis acid effective to initiate polymerization of said epoxide material, said salt being present in an amount equal to between about 0.5 percent and about 5 percent of the weight of said epoxide material present in said composition;
and a gelation inhibitor for counteracting prematurely formed Lewis acid, said inhibitor being a 1-substituted 2-pyrrolidinone present in an amount by weight equal to between about 0.02 percent and about 1.5 percent of the weight of said composition.

17. The composition of claim 16, in which the total amount of any unpolymerizable volatile solvent present in said composition is less than about 4 percent by weight of the liquid composition.

18. The composition of claim 16, in which the polymerizable material is a mixture of epoxides and gamma-butyrolactone.

19. The composition of claim 16, in which the polymerizable material is a mixture of epoxides and dodecyl vinyl ether.

20. The composition of claim 16, in which the polymerizable material is a mixture of epoxides and dodecyl vinyl ether.

21. The process of polymerizing a polymerizable material consisting essentially of monomeric or prepolymeric epoxides or mixtures thereof in admixture with a monomer selected from the group consisting of lactones and vinyl-containing compounds having the general formula:

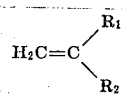

wherein $R_1$ and $R_2$ are hydrogen, alkyl, alkoxy, aryl, aryloxy, halogen, haloalkyl, haloaryl and carbazolyl,
said mixture being polymerizable to higher molecular weights through the action of a cationic catalyst, comprising:
forming a mixture of the polymerizable material with a radiation-sensitive catalyst precursor with decomposes upon application of energy to provide a Lewis acid effective to initiate polymerization of said polymerizable material, said precursor being an aromatic diazonium salt of a complex halogenide, and with a stabilizing amount of a gelation inhibitor for counteracting prematurely formed Lewis acid, said inhibitor being a cyclic amide in which the amide nitrogen atom is free of unsubstituted hydrogen, and said stabilizing amount of the inhibitor being substantially inert to said polymerizable material and said catalyst precursor;
and subsequently applying energy to the resulting mixture to release said Lewis acid in sufficient amounts to effect substantial polymerization of the polymerizable material.

22. The process of claim 21, in which the monomeric or prepolymeric epoxide is a mixture of epoxides.

23. The process of claim 21, in which the polymerizable material is a mixture of epoxides and a lactone.

24. The process of claim 21, in which the polymerizable material is a mixture of epoxides and a vinyl-containing compound.

25. The process of claim 21, in which said catalyst precursor is mixed with said polymerizable material in an amount equal to between about 0.5 percent and about 5 percent of the weight of the polymerizable material.

26. The process of claim 21, in which said cyclic amide mixed with the polymerizable material and the catalyst precursor is selected from the group consisting of 1-alkyl-2-pyrrolidinone, poly(1-vinyl-2-pyrrolidinone), 1-alkyl-2-piperidone, and 1-alkyl-2(1H)-pyridone.

27. The process of claim 26, in which said cyclic amide is a 1-substituted 2-pyrrolidinone.

28. The process of claim 21, in which the cyclic amide is mixed with the polymerizable material and the catalyst precursor is 1-alkyl-2-pyrrolidinone.

29. The process of claim 21, in which the cyclic amide is mixed with the polymerizable material and the catalyst precursor is 1-methyl-2-pyrrolidinone.

30. The process of claim 21, in which the cyclic amide mixed with the polymerizable material and the catalyst precursor is poly(1-vinyl-2-pyrrolidinone).

31. The process of claim 21, in which said gelation inhibitor is mixed with said polymerizable material and said catalyst precursor in an amount equal to between about 0.02 percent and about 1.5 percent of the weight of the resulting mixture.

32. The process of claim 21, in which said mixture resulting from mixing the polymerizable material, the catalyst precursor, and the gelation inhibitor contains less than about 4 percent by weight of any unpolymerizable volatile solvents which may be present therein.

* * * * *